US011085833B2

(12) United States Patent
Vella et al.

(10) Patent No.: US 11,085,833 B2
(45) Date of Patent: Aug. 10, 2021

(54) TEMPERATURE SENSOR INK COMPOSITION WITH METAL OXIDE NANOPARTICLES

(71) Applicant: Xerox Corporation, Norwalk, CT (US)

(72) Inventors: Sarah J. Vella, Milton (CA); Guiqin Song, Milton (CA); Chad Smithson, Guelph (CA); Yujie Zhu, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 393 days.

(21) Appl. No.: 16/175,989

(22) Filed: Oct. 31, 2018

(65) Prior Publication Data
US 2020/0132559 A1 Apr. 30, 2020

(51) Int. Cl.
| | |
|---|---|
| *G01K 7/22* | (2006.01) |
| *B41M 5/00* | (2006.01) |
| *C09D 11/033* | (2014.01) |
| *C09D 11/037* | (2014.01) |
| *C09D 11/106* | (2014.01) |
| *C09D 11/322* | (2014.01) |
| *C09D 11/36* | (2014.01) |
| *C09D 11/52* | (2014.01) |

(52) U.S. Cl.
CPC ............ *G01K 7/226* (2013.01); *B41M 5/0023* (2013.01); *C09D 11/033* (2013.01); *C09D 11/037* (2013.01); *C09D 11/106* (2013.01); *C09D 11/322* (2013.01); *C09D 11/36* (2013.01); *C09D 11/52* (2013.01)

(58) Field of Classification Search
None
See application file for complete search history.

(56) References Cited

U.S. PATENT DOCUMENTS

| | | | |
|---|---|---|---|
| 5,372,852 A | 12/1994 | Titterington et al. | |
| 6,260,954 B1 | 7/2001 | Lima-Marques | |
| 6,547,380 B2 | 4/2003 | Smith et al. | |
| 2009/0165289 A1 | 7/2009 | Deng et al. | |
| 2012/0038716 A1 | 2/2012 | Hoerteis et al. | |
| 2013/0203201 A1* | 8/2013 | Britton | H01C 7/041 438/54 |
| 2016/0297977 A1* | 10/2016 | Albaugh | H01B 3/08 |
| 2017/0226362 A1* | 8/2017 | Fratello | B33Y 70/00 |
| 2018/0155561 A1 | 6/2018 | Li et al. | |

FOREIGN PATENT DOCUMENTS

| | | |
|---|---|---|
| CA | 854 894 | 10/1970 |
| CA | 868 637 | 4/1971 |
| CN | 105 153 808 A | 12/2015 |

OTHER PUBLICATIONS

English translation of CN 105153808, Dec. 2015; 13 pages.*
Extended European Search Report issued in European Application No. 19205758.6-1102, dated Mar. 16, 2020.

* cited by examiner

*Primary Examiner* — Helene Klemanski
(74) *Attorney, Agent, or Firm* — Marylou J. Lavoie, Esq. LLC

(57) ABSTRACT

A temperature sensitive ink composition including a metal oxide nanoparticle; a binder; a solvent; an optional dispersant; and an optional surfactant; wherein the ink composition is a thermistor ink that exhibits a change in resistance which is dependent on temperature. A process for preparing the ink composition. A process including depositing the ink composition onto a substrate to form deposited features; and optionally, heating the deposited features on the substrate to form temperature sensitive features on the substrate, wherein depositing can include ink jet printing or aerosol jet printing.

20 Claims, 3 Drawing Sheets

TEMPERATURE SENSOR INK COMPOSITION WITH METAL OXIDE NANOPARTICLES

BACKGROUND

Disclosed herein is a temperature sensitive ink composition including a metal oxide nanoparticle; a binder; a solvent; an optional surfactant; and an optional dispersant; wherein the ink composition is a thermistor ink that exhibits a change in resistance which is dependent on temperature. Further disclosed is a process for preparing the ink composition. Further disclosed is a process including depositing the ink composition onto a substrate to form deposited features; and optionally, heating the deposited features on the substrate to form temperature sensitive features on the substrate, wherein depositing can include ink jet printing or aerosol jet printing.

Printed electronics is an emerging industry that aims to print low cost electronic components to add function to otherwise inanimate objects. Unlike conventional electronics, printed electronics is not restricted to rigid substrates. Instead, printed electronics targets flexible and/or non-planar substrates, typically low Tg plastics. However, printed electronics is still in its infancy, and there is a limited number of printable materials for creating functional devices. Most of the available printable materials are conductive inks, such as silver nanoparticle inks, or resistive inks, such as carbon black inks. Furthermore, the available materials are usually formulated as a paste, which is suitable for printing techniques such as screen printing, but unsuitable for digital printing technologies such as aerosol jet printing and ink jet printing.

Sensor materials are an important portion of printed electronics, and each sensor requires a unique material set. Many materials exhibit a change in resistance to temperature. However, the magnitude of the change in resistance to change in temperature is low for most materials. To the best of Applicant's knowledge, there are no known jettable metal oxide thermistor inks.

Metal oxides provide some of the highest resistance changes to temperature. To the best of Applicant's knowledge, there is no current metal oxide based temperature sensor material that is suitable for ink jet or aerosol jet printing.

Ink jetting devices are known in the art, and thus extensive description of such devices is not required herein. As described in U.S. Pat. No. 6,547,380, incorporated herein by reference, ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are at least four types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands. Still another type of drop-on-demand system is tonejet printing comprising an electrostatic drop-on-demand deposition technology. The tonejet process consists of electrostatic concentration and ejection of particles from a fluid. The tonejet print head enables an electric field to be applied to the ink. The tonejet ink comprises electrically charged conventional pigments in a non-conductive liquid. In the tonejet print head, an electric force is applied directly to the charged ink particles. The longer the electric pulse is applied, the more ink is ejected. See, for example, U.S. Pat. No. 6,260,954, which is hereby incorporated by reference herein in its entirety, which describes in the Abstract thereof a method and apparatus for the generation of agglomerations of particulate material in a liquid. Agglomerations are built up at a point under the effect of an electric field and ejected by electrostatic means. The size of the agglomeration is dependent upon the strength of the electric field, point geometry, the nature of the liquid, and the nature of the particles. Agglomerations of particles in the range of from 1 to 500 microns are produced. The invention is useful for non-impact printing and other applications where delivery of agglomerations of particles is useful such as in inhalable pharmaceuticals.

In a typical design of a piezoelectric ink jet device utilizing phase change inks printing directly on a substrate or on an intermediate transfer member, such as the one described in U.S. Pat. No. 5,372,852, incorporated herein by reference, the image is applied by jetting appropriately colored inks during four to eighteen rotations (incremental movements) of a substrate (an image receiving member or intermediate transfer member) with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

An aerosol printer is described, for example, in U. S. Patent Publication 2012/0038716, which is hereby incorporated by reference herein in its entirety. U. S. Patent Publication 2012/0038716 describes in the Abstract thereof an aerosol printer which has at least one atomizing chamber and at least one printing head with at least one nozzle, these being connected directly or via connection lines. Furthermore, the aerosol printer has process gas-, transport gas- and focusing gas lines. An aerosol printer can be characterized by the method of creating the aerosol. For example, an ultrasonic aerosol printer creates the aerosol via ultrasonic vibration and a pneumatic aerosol printer creates the aerosol mist using a pipe disposed in the ink chamber in direct contact with the ink.

While currently available sensor materials are suitable for their intended purposes, a need remains for improved materials suitable for printed electronics. Further, a need remains for temperature sensor materials. Still further, a need remains for temperature sensor materials suitable for ink jet printing or aerosol jet printing.

The appropriate components and process aspects of each of the foregoing U. S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a temperature sensitive ink composition comprising a metal oxide nanoparticle; a binder; a solvent; an optional dispersant; and an optional surfactant; wherein the ink composition is a thermistor ink that exhibits a change in resistance which is dependent on temperature.

Also described is a process for preparing an ink composition comprising combining a metal oxide nanoparticle; a binder; a solvent; an optional dispersant; and an optional surfactant; wherein the ink composition is a thermistor ink that exhibits a change in resistance which is dependent on temperature.

Also described is a process comprising providing a composition comprising a metal oxide nanoparticle; a binder; a solvent; an optional dispersant; and an optional surfactant; wherein the ink composition is a thermistor ink that exhibits a change in resistance which is dependent on temperature; depositing the ink composition onto a substrate to form deposited features; and optionally, heating the deposited features on the substrate; to form temperature sensitive features on the substrate.

DETAILED DESCRIPTION

Figure 1:
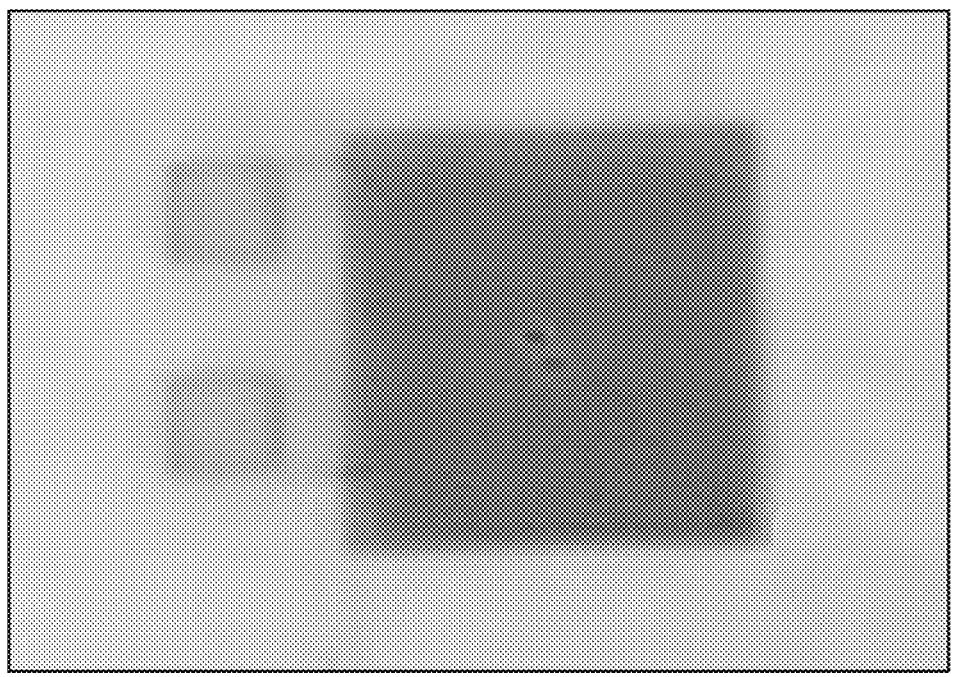
FIG. 1 is an image of a temperature sensitive ink composition of the present disclosure printed onto silver electrodes on a flexible polyethylene naphthalate substrate.

A thermistor ink composition, also referred to herein as a temperature sensitive ink composition, is provided. In embodiments, the thermistor ink composition is a temperature sensitive ink composition comprising a metal oxide nanoparticle; a binder; a solvent; an optional surfactant; and an optional dispersant; wherein the ink composition is a thermistor ink that exhibits a change in resistance which is dependent on temperature.

In certain embodiments, the ink composition comprises nickel oxide nanoparticles, polyvinyl butyral, and a solvent or solvent mixture. In embodiments, the ink composition comprises a combination of solvents, in embodiments, propylene glycol methyl ether acetate and 1-phenoxy-2-propanol.

Metal Oxide Nanoparticles.

The ink composition herein comprises metal oxide nanoparticles. The metal oxide nanoparticles may have any shape or geometry. In embodiments, the metal oxide nanoparticles have a spherical shape. The metal oxide nanoparticles can have a diameter in the submicron range. In embodiments, the metal oxide nanoparticles have a volume average particle size of from about 0.5 to about 100 nanometers (nm), or from about 1.0 to about 50 nm, or from about 1.0 to about 20 nm. In embodiments, metal oxide nanoparticles herein comprise nanoparticles of a size such that they can be dried, sintered, or annealed at low temperatures, such as, at a temperature of less than about 200° C., or less than about 100° C. In specific embodiments, the metal oxide nanoparticles have a volume average particle size of from about 0.5 to about 50 nm, or from about 1 to about 20 nm, or from about 5.0 to about 10 nm. In other specific embodiments, the ratio of the volume average particle size to the number mean length diameter of the metal oxide nanoparticles is less than about 1.3, or less than about 1.2, or less than about 1.1.

The characteristics of the metal oxide nanoparticles may be determined by any suitable technique and apparatus. Volume average particle diameter may be measured by means of a measuring instrument such as a dynamic light scattering particle analyzer, operated in accordance with the manufacturer's instructions. Volume average particle diameter may be derived, for example, by means of a measuring instrument such as a Malvern Instruments Zetasizer® Nano S, operated in accordance with the manufacturer's instructions.

The metal oxide nanoparticle selected may be any suitable or desire metal oxide nanoparticle including, but not limited to, cobalt oxide, nickel oxide, iron oxide, manganese oxide, titanium oxide, barium titanium oxide, barium titanate, lead oxide, lead titanate, strontium titanate, zinc oxide, copper oxide, tin oxide, among others, and composites thereof and combinations thereof. In embodiments, the metal oxide nanoparticle is selected from the group consisting of cobalt oxide, nickel oxide, iron oxide, manganese oxide, titanium oxide, barium titanium oxide, barium titanate, lead oxide, lead titanate, strontium titanate, zinc oxide, copper oxide, tin oxide, and combinations thereof. In certain embodiments, the metal oxide nanoparticle is a nickel oxide nanoparticle.

The metal oxide nanoparticles may be simple metal oxides, complex metal oxides, or a combination thereof. In embodiments, the ink formulation may include either or both of (i) one or more simple metal oxides and (ii) one or more complex metal oxides.

Nickel oxide nanoparticles can be obtained from US Research Nanomaterials, Inc.

The metal oxide nanoparticles can be present in the ink composition in any suitable or desired amount. In embodiments, the metal oxide nanoparticles are present in the ink composition in an amount of from about 1 to about 65 weight percent, or from about 5 to about 40 weight percent, or from about 10 to about 25 weight percent, wherein weight percent is percent by weight based upon the total weight of the ink composition.

Binder.

Any suitable or desired binder or combination of binders can be selected for the ink compositions herein. In embodiments, the binder is selected from the group consisting of polyvinyl butyral, poly vinyl phenol, poly vinyl alcohol, poly(dimethylsiloxane), poly(ethylene vinyl acetate), polyethylene, polypropylene, polystyrene, poly(ethylene glycol), poly(methyl methacrylate), poly(oxymethylene), poly(vinyl phenol-co-methacrylate), poly(isoprene), poly(butadiene), poly(styrene-isoprene-styrene), poly(styrene-butadiene-styrene), polyurethane, polyurea, poly(styrene-ethylene-butylene-styrene), polyester, cellulose, and combinations thereof. In a specific embodiment, the binder is polyvinyl butyral.

In another embodiment, the metal oxide nanoparticle is a nickel oxide nanoparticle and the binder is polyvinyl butyral.

In embodiments, the binder is a polyvinyl butyral. Polyvinyl butyral is a polyvinyl acetal which is prepared from condensation of aldehydes and polyvinyl alcohols. The polymer may comprise three proportions of monomeric units that are randomly distributed along the polymeric molecule: A) vinyl butyral, B) vinyl alcohol, and C) vinyl acetate.

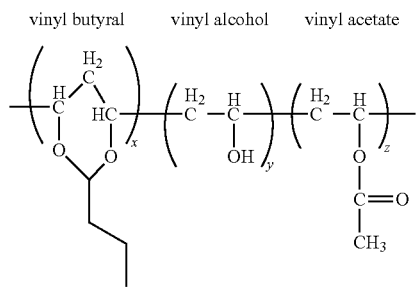

Typical average molecular weight ranges from about 25,000 to about 150,000. The polymer may contain hydroxyl content (expressed as percentage of polyvinyl alcohol) ranging from about 11.0% to about 17.5%, acetate content (expressed as percentage of polyvinyl acetate) ranging from about 0% to about 2.5%, and butyral content (expressed as percentage of polyvinyl butyral) ranging from about 80% to about 88%.

Polyvinyl butyrals sold under the tradename Butvar® are available from Eastman Chemical Company. Suitable Butvar® polyvinyl butyral include Butvar® B-72, Butvar® B-74, Butvar® B-76, Butvar® B-79, Butvar® B-90, and Butvar® B-98.

The binder can be present in the ink composition in any suitable or desired amount. In embodiments, the binder is present in the ink composition in an amount of from about 0.1 to about 25 weight percent, or from about 0.5 to about 15 weight percent, or from about 5 to about 10 weight percent, wherein weight percent is percent by weight based upon the total weight of the ink composition.

Solvent.

Any suitable or desired solvent or combination of solvents can be selected for the temperature sensitive ink compositions herein. In embodiments, the ink compositions contain a particular combination of solvent, wherein the solvents are compatible with the metal oxide nanoparticle, so as to provide the ink composition with certain characteristics favorable to ink jet printing or aerosol printing while, in combination, achieving the characteristics for functioning as a thermistor ink.

In embodiments, the solvent is selected from the group consisting of propylene glycol monomethyl ether acetate, 1-phenoxy-2-propanol, di(propylene glycol) monomethyl ether acetate, propylene glycol methyl ether, di(propylene glycol)methyl ether, methyl isobutyl ketone, diisobutyl ketone, methyl ethyl ketone, water, and combinations thereof. In a particular embodiment, the solvent comprises a combination of propylene glycol methyl ether acetate and 1-phenoxy-2-propanol.

The solvent can be present in the ink composition in any suitable or desired amount. In embodiments, the solvent or total amount of solvent where there is a combination of two or more solvents, is present in the ink composition in an amount of from about 30 to about 99 percent, or from about 50 to about 95 percent, or from about 70 to about 90 percent, by weight based upon the total weight of the ink composition.

In embodiments, the ink composition comprises a selected ratio of metal oxide nanoparticle to binder to provide a thermistor ink having a viscosity suitable for digital printing including ink jet printing or aerosol printing while also achieving properties desired for thermistor ink applications as described herein including stable suspension, desired β value, adhesion, accuracy, and treating capabilities such as heating or sintering.

In embodiments, the ink compositions herein comprise a ratio of metal oxide nanoparticle to binder of about 1,000:1, or about 100:1, or about 20:1, or about 10:1.

In embodiments, the ink compositions herein comprise nickel oxide nanoparticles, a binder, and a solvent. In embodiments, the ink compositions herein comprise nickel oxide nanoparticles, polyvinyl butyral, and a solvent. In a particular embodiment, the ink compositions herein comprise nickel oxide nanoparticles, polyvinyl butyral, and a solvent combination comprising propylene glycol methyl ether acetate and 1-phenoxy-2-propanol.

In embodiments, the metal oxide nanoparticle is present in the ink composition in an amount of from about 1 to about 65 percent by weight based upon the total weight of the ink composition; and the binder is present in the ink composition in an amount of from about 0.1 to about 25 weight percent by weight based upon the total weight of the ink composition.

In embodiments, the metal oxide nanoparticle is present in the ink composition in an amount of from about 10 to about 50 percent by weight based upon the total weight of the ink composition; the binder is present in an amount of from about 0.5 to about 25 percent by weight based upon the total weight of the ink composition; and the solvent is present in an amount of from about 40 to about 99 percent by weight based upon the total weight of the ink composition.

In embodiments, the metal oxide nanoparticle is present in the ink composition in an amount of from about 0.5 to about 40 percent by weight based upon the total weight of the ink composition; the binder is present in an amount of from about 0.1 to about 15 percent by weight based upon the total weight of the ink composition; and the solvent is present in an amount of from about 30 to about 99 percent by weight based upon the total weight of the ink composition.

In certain embodiments, the metal oxide nanoparticle is a nickel oxide nanoparticle and the nickel oxide nanoparticle and binder are present in a ratio of nickel oxide nanoparticle to binder of about 25:1. In certain embodiments, the metal oxide nanoparticle is a nickel oxide nanoparticle and the nickel oxide nanoparticle and binder are present in a ratio of nickel oxide nanoparticle to binder of about 10:1.

Dispersant.

The ink compositions may optionally further comprise a dispersant. Any suitable or desired dispersant can be selected. In embodiments, suitable dispersants include copolymers and block copolymers containing affinic groups, such as amines, esters, alcohols and carboxylic acids and salts thereof. Illustrative examples of suitable dispersants include dispersants selected from Efka® 4008, Efka® 4009, Efka® 4047, Efka® 4520, Efka® 4010, Efka® 4015, Efka® 4020, Efka® 4050, Efka® 4055, Efka® 4080, Efka® 4300, Efka® 4330, Efka® 4400, Efka® 4401, Efka® 4403, Efka® 4406, Efka® 4800, all available from BASF, Charlotte, N.C., Disperbyk® 101, Disperbyk® 102, Disperbyk® 107, Disperbyk® 108, Disperbyk® 109, Disperbyk® 110, Disperbyk® 111, Disperbyk® 112, Disperbyk® 115, Disperbyk® 162, Disperbyk® 163, Disperbyk® 164, Disperbyk® 2001, all available from BYK Additives & Instruments, Wesel Germany, Solsperse® 24000 SC/GR, Solsperse® 26000, Solsperse® 32000, Solsperse® 36000, Solsperse® 39000, Solsperse® 41000, Solsperse® 71000 all available from Lubrizol Advanced Materials, Inc. Cleveland, Ohio or mixtures or combinations thereof.

In specific embodiments, the dispersant includes K-Sperse® XDA-504 from King Industries, Norfolk, Conn. The dispersant may be present in the ink compositions in any suitable or desired amount, in embodiments, in an amount of about 0 to about 30 percent by weight, or from about 0 to about 20 percent by weight, or from about 1 to about 10 percent by weight, or from about 6 to about 10 percent by weight, based upon the total weight of the ink composition.

Surfactant.

The inks disclosed herein may also contain an optional surfactant. Any suitable or desired surfactant can be selected. Examples of suitable surfactants include ionic surfactants, anionic surfactants, cationic surfactants, nonionic surfactants, zwitterionic surfactants, and the like, as well as mixtures thereof. Examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like, with specific examples including primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyldimethylbetaine, and lauryldihydroxyethylbetaine; fluorosurfactants; and the like, as well as mixtures thereof. Additional examples of nonionic surfactants include polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc as IGEPAL CA210™ IGEPAL CA520™, IGEPAL CA720™, IGEPAL CO-890™, IGEPAL C0-720™, IGEPAL C0-290™, IGEPAL CA-21O™ ANTAROX 890™, and ANTAROX 897™. Other examples of suitable nonionic surfactants include a block copolymer of polyethylene oxide and polypropylene oxide, including those commercially available as SYNPERONIC™ PE/F, such as SYNPERONIC™ PE/F 108. Other examples of suitable anionic surfactants include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Sigma-Aldrich, NEOGEN R™, NEOGEN SC™ available from Daiichi Kogyo Seiyaku, combinations thereof, and the like. Other examples of suitable anionic surfactants include DOWFAX™ 2A1, an alkyldiphenyloxide disulfonate from Dow Chemical Company, and/or TAYCA POWER BN2060 from Tayca Corporation (Japan), which are branched sodium dodecyl benzene sulfonates. Other examples of suitable cationic surfactants, which are usually positively charged, include alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C12, C15, C17 trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, as well as mixtures thereof. Mixtures of any two or more surfactants can be used.

The optional surfactant can be present in any desired or effective amount, in embodiments, the surfactant is present in an amount of from about 0.01 to about 5 percent by weight, based on the total weight of the ink composition. It should be noted that the surfactants are named as dispersants in some cases.

The ink compositions can further comprise additives. Optional additives that can be included in the ink compositions include biocides, fungicides, pH controlling agents such as acids or bases, phosphate salts, carboxylates salts, sulfite salts, amine salts, buffer solutions, and the like, sequestering agents such as EDTA (ethylenediamine tetra acetic acid), viscosity modifiers, leveling agents, and the like, as well as mixtures thereof.

In embodiments, the temperature sensitive ink compositions herein are can be digitally printed, in embodiments, by ink jet printing or aerosol jet printing.

The printing of the present ink composition results in quality films of the ink material.

For example, the temperature sensitive ink compositions exhibit excellent adhesion strength. Adhesion strength can be measured using an adhesion test wherein patches of the ink to be tested are printed onto a substrate, in embodiments, of onto a flexible polyethylene naphthalate, and then cured at 120° C. for 1 hour. The number of printing passes can be selected as desired to prepare a continuous film that provides consistent results. In embodiments, the ink is disposed at a layer thickness of from about 100 nanometers to about 100 micrometers. The adhesion of the ink is assessed by scoring the printed patches in a cross-hatched pattern with a scalpel blade, then applying Scotch™ tape over the scored patch, and peeling off the tape. The amount of transfer of the printed material onto the tape indicates the adhesiveness of the ink. An established SIR (Standard Image Reference) chart quantifies the adhesiveness on 5 levels:
1. No adhesion—all the ink transfers to the tape
2. Low adhesion—most of the ink transfers to the tape
3. Partial adhesion—the ink is evenly split between the substrate and the tape
4. Excellent adhesion—very little ink transfers to the tape
5. Perfect adhesion—none of the ink transfers to the tape In embodiments, the temperature sensitive ink compositions exhibit an adhesion strength when printed on a plastic substrate, in embodiments, when printed on a polyethylene naphthalate substrate, of at least about 4 or about 5, as determined using the above described adhesion test In embodiments, the ink herein, when subjected to an adhesion test comprising printing the ink composition onto a plastic substrate, heating the printed ink at about 120° C. for about 1 hour, scoring the printed ink in a cross-hatched pattern with a scalpel blade, applying Scotch™ tape over the scored patch, and peeling off the tape; on a scale of 1 to 5, with 1 being the worst and 5 being the best; the ink provides a result of 4, meaning excellent adhesion with very little ink transfer to the tape.

Thermistors are non-linear resistors that exhibit a change in their intrinsic resistance characteristics with a change in temperature. Negative Temperature Coefficient (NTC) Thermistors exhibit a decrease in resistance with increasing temperatures (that is, with increasing temperature, more electrons are promoted into the conduction band, therefore resistance decreases and conductivity increases). There also exists Positive Temperature Coefficient (PTC) Thermistors that show the opposite behavior (increase in temperature results in an increase in resistance). The manner in which the resistance of a thermistor changes is related to a constant beta ($\beta$). $\beta$ is an intrinsic property measured in degrees Kelvin (K) and is calculated using the formula $$\beta = \frac{\ln\frac{(R_{T1})}{(R_{T2})}}{\frac{(1-1)}{(T_1 T_2)}}$$

where:
$R_{T1}$=Resistance at Temperature 1
$R_{T2}$=Resistance at Temperature 2
$T_1$=Temperature 1 (K)
$T_2$=Temperature 2 (K)

The bigger the 13 value, the more sensitive the thermistor is for a given range. Nickel oxide has one of the largest 13 values and is particularly selected in embodiments herein.

In embodiments, resistance versus temperature measurements indicate that the printed thermistor films prepared with the present ink composition approach the theoretical value of $\beta$ (4300 K), a value used to describe the sensitivity of the thermistor, for nickel oxide. In embodiments, a printed thermistor film prepared with the ink of claim 1 provides a $\beta$ value which approaches the theoretical value of $\beta$ (4300 K). By approaches the theoretical value of $\beta$ (4300 K), it is meant that the $\beta$ value is at least about 3,500 K to about 4300 K, or at least about 4100 K to about 4300 K, or at least about 4200 K to about 4300 K.

In embodiments, the temperature sensitive ink compositions are jettable, in embodiments, ink jet printable or aerosol jet printable.

Viscosity can be measured by any suitable or desired method as known in the art, such as with an Ares G2 Rheometer from TA Instruments. Viscosity data can be obtained, for example, at 25° C. on an Ares G2 Rheometer from TA Instruments using a 50 millimeter cone, 0.053 microns gap.

In embodiments, the temperature sensitive ink compositions herein have a viscosity of from about 5 to about 1,000 centipoise, or from about 8 to about 500 centipoise, or from about 5 to about 300 centipoise, or from about 10 to about 250 centipoise, at a temperature of from about 20 to about 30° C.

The temperature sensitive ink composition herein can be employed in any suitable or desired printing process. A process herein comprises providing the present ink composition; depositing the ink composition onto a substrate to form deposited features, an ink image, or a combination thereof. The printing process can comprise an ink jet printing process, an aerosol printing process, a pneumatic aerosol printing process, or other suitable process.

In embodiments, the process further comprises treating the printed ink composition. Treating can comprise any suitable or desired process including drying the deposited features on the substrate, heating the deposited features on the substrate, sintering the deposited features on the substrate, irradiating the deposited features on the substrate, or any other suitable or desired treatment. Treating can be done for any suitable or desired time.

In embodiments, the temperature sensitive ink compositions can be cured at a low temperature. In embodiments, the temperature sensitive ink compositions herein can be cured at a temperature of from about 40 to about 300° C., or from about 50 to about 200° C., or from about 60 to about 150° C. In certain embodiments, the temperature sensitive ink compositions herein can be cured at a temperature of less than or equal to about 120° C. In embodiments, the ink compositions herein can be treated for a period of from about 5 minutes to about 6 hours, or from about 15 minutes to about 2 hours, or from about 30 minutes to about 1 hour. In embodiments, the ink compositions herein can be treated at temperatures as low as 120° C. for about 1 hour.

In embodiments, the temperature sensitive ink compositions herein provide a high accuracy. Accuracy as used herein means a predictable change in measured resistance caused by a set change in temperature. In embodiments, the temperature sensitive ink compositions herein have an accuracy of from about 0.01 to about 15° C., or from about 0.1 to about 5° C., or from about 0.5 to about 1° C. In embodiments, the temperature sensitive ink compositions herein have an accuracy of less than or equal to 0.5° C.

In embodiments, the temperature sensitive ink composition herein is ink jet printable or aerosol jet printable, cures at a low temperature of less than about 120 C, has an accuracy of less than or equal to about 0.5° C., and has a high 13 value of greater than about 2,000K.

The ink compositions herein are air stable at room temperature. By air stable, it is meant that it will not decompose or react with oxygen or water or any other common molecules in the air. In embodiments, the printed ink compositions can be overcoated with a protective barrier. Any suitable or desired protective barrier coating can be selected as is known in the art.

The metal oxide nanoparticles are very well dispersed in the ink composition. By very well dispersed, it is meant that they form a homogeneous dispersion, where the particles remain suspended in the ink formulation without settling at room temperature and without continual agitation, for an extended period of time (at least 4 hours).

Thermistor Ink.

The temperature sensitive ink compositions herein are thermistor inks. In embodiments, ink compositions comprising ratios of nickel oxide to binder as disclosed herein had 13 values in the range of from about 3900 to about 4300 K. Decrease from the theoretical value of 4300 K is believed to be caused by the presence of the binder.

The ink compositions can be prepared by any suitable process, such as by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, in embodiments from about 5 to about 10 minutes, up to about 24 hours. Alternatively, the optional ink additives can be mixed with the other ink ingredients during the ink preparation process, which takes place according to any desired procedure, such as by mixing all the ingredients, heating if desired, and filtering.

In embodiments, a process for preparing an ink composition herein comprises combining a metal oxide nanoparticle; a binder; a solvent; an optional surfactant; and an optional dispersant; wherein the ink composition is a thermistor ink that exhibits a change in resistance which is dependent on temperature.

The ink compositions can be employed in any suitable or desired printing process. A process herein comprises providing the present ink composition; depositing the ink composition onto a substrate to form deposited features, an ink image, or a combination thereof. The printing process can comprise a digital printing process including an ink jet printing process, an aerosol printing process, or a pneumatic aerosol printing process. In embodiments, the process further comprises treating, in embodiments, heating the deposited features on the substrate to form temperature sensitive features on the substrate. The process can also comprise other methods of treating the deposited features on the substrate including drying by any suitable or desired method.

In embodiments, a process herein comprises providing a composition comprising a metal oxide nanoparticle; a binder; a solvent; an optional surfactant; and an optional dispersant; wherein the ink composition is a thermistor ink that exhibits a change in resistance which is dependent on temperature; depositing the ink composition onto a substrate to form deposited features; and optionally, heating the deposited features on the substrate to form temperature sensitive features on the substrate. In a specific embodiment, depositing the ink composition comprises depositing using aerosol printing or ink jet printing.

The substrate upon which the metal oxide features are deposited may be any suitable substrate including silicon, glass plate, plastic film, sheet, fabric, or paper. For structurally flexible devices, plastic substrates such as polyester, polycarbonate, polyimide sheets, and the like, may be used. In embodiments, the substrate is a polyethylene naphthalate substrate. The thickness of the substrate can be any suitable thickness such as about 10 micrometers to over 10 millimeters with an exemplary thickness being from about 50 micrometers to about 2 millimeters, especially for a flexible plastic substrate, and from about 0.4 to about 10 millimeters for a rigid substrate such as glass or silicon.

Heating the deposited ink composition can be to any suitable or desired temperature, such as to from about 70° C. to about 200° C., or any temperature sufficient to form temperature sensitive features. The heating temperature is one that does not cause adverse changes in the properties of previously deposited layers or the substrate. In embodiments, use of low heating temperatures allows use of low cost plastic substrates, which have glass transition temperatures of below about 300° C., in embodiments, below about 150° C., in embodiments, at about 120° C.

The heating can be for any suitable or desired time, such as from about 0.01 second to about 10 hours. In embodiments, heating can be performed under vacuum. The heating can be performed in air, in an inert atmosphere, for example under nitrogen or argon, or in a reducing atmosphere, for example, under nitrogen containing from about 1 to about 20 percent by volume hydrogen. The heating can also be performed under normal atmospheric pressure or at a reduced pressure of, for example, about 1000 mbars to about 0.01 mbars.

Heating encompasses any technique that can impart sufficient energy to the heated material or substrate to (1) anneal, sinter, or heat to a desired amount the metal oxide nanoparticles and/or (2) remove optional stabilizer from the metal nanoparticles. Examples of heating techniques include thermal heating (for example, a hot plate, an oven, and a burner), infra-red ("IR") radiation, laser beam, flash light, microwave radiation, or ultraviolet ("UV") radiation, photosintering, or a combination thereof.

In embodiments, after heating, the resulting temperature sensitive feature has a thickness ranging from about 0.25 to about 20 micrometers, or from about 0.5 to about 10 micrometers. In certain embodiments, after heating, the resulting temperature sensitive feature has a thickness of from about 1 to about 7 micrometers.

The resulting elements can be used for any suitable or desired application, in embodiments for thermistor applications.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Nickel oxide nanoparticles were purchased from US Research Nanomaterials, Inc. Particles selected for the examples herein had a diameter of about 18 nanometers.

Polyvinyl butyrals (PVB) of different molecular weights and hydroxyl content were selected for the examples herein including Butvar® B-72, Butvar® B-74, Butvar® B-76, Butvar® B-79, Butvar® B-90, Butvar® B-98.

Silver nanoparticle ink supplied by the Xerox® Research Centre of Canada was used to prepare the spiral resistor pattern.

Example 1

NiO Ink Composition. A magnetic stir bar was added to a 30 milliliter brown bottle. 6.5 grams of 10 percent polyvinyl butyral (Mw=50,000) were added to propylene glycol methyl ether acetate. 1.5 grams of propylene glycol methyl ether acetate were then added. 7.0 grams of 1-phenoxy-2- propanol were then added. 5.0 grams of NiO cubic 18 nanometer particles were then added. The mixture was stirred overnight. The concentration of NiO was about 25%.

Example 2

NiO Ink Composition. A magnetic stir bar was added to a 30 milliliter brown bottle. 4.4 grams of 10% polyvinyl butyral (Mw=50,000) were added to propylene glycol methyl ether acetate. 4.8 grams of propylene glycol methyl ether acetate were then added. 5.8 grams of 1-phenoxy-2-propanol were then added. 5.0 grams of NiO cubic 18 nanometer particles were then added. The mixture was stirred overnight. The concentration of NiO was about 25%.

Example 3

A magnetic stir bar was added to a 30 milliliter brown bottle. 4.0 grams of 10 percent polyvinyl butyral (Mw=50,000) were added to propylene glycol methyl ether acetate. 13.0 grams of propylene glycol methyl ether acetate were then added. 3.0 grams of NiO cubic 18 nanometer particles were then added. The mixture was stirred overnight. The concentration of NiO was about 25%.

Example 4

A magnetic stir bar was added to a 30 milliliter brown bottle. 4.0 grams of 10 percent polyvinyl butyral (Mw=36,000) were added to propylene glycol methyl ether acetate. 13.0 grams of propylene glycol methyl ether acetate were then added. 3.0 grams of NiO cubic 18 nanometer particles were then added. The mixture was stirred overnight. The concentration of NiO was about 15%.

The inks of Examples 1 and 2 were characterized as shown in Table 1. The viscosity data were obtained at 25° C. on an Ares G2 Rheometer from TA Instruments using a 50 millimeter cone, 0.053 gap. A rate sweep was run from 40 to 400 s$^{-1}$.

TABLE 1

| | Complex Viscosity (40-400s−1) (centipoise) |
|---|---|
| Example 1 | 31.41 |
| Example 2 | 47.20 |

The ink of Example 1 was printed using an Optomec Aerosol Jet® System in Pneumatic Aerosol mode (PA). A 300 μm (micrometer) nozzle was used with a 3 millimeter offset distance between the nozzle and the substrate. The printing rate was maintained at 10 millimeter/second. The gas flow parameters used to print the ink of Example 1 were as follows: Sheath Gas=0.26-0.31 PSI (pounds per square inch); Atomization Gas=20-21 PSA; Exhaust gas=630 cm$^3$/minute. The ink was jetted onto flexible PEN (polyethylene naphthalate) substrates.

The ink remained a stable suspension over a 5 hour printing run. The probes, the virtual impactor, and nozzle all remained unclogged.

The ink was printed onto an interdigitated spiral electrode pattern that had been previously aerosol jet printed with silver nanoparticle ink. Two, four, and ten passes produced the square patches of thermistor ink on the silver electrodes pattern by rastering the print in a serpentine pattern with 100 μm center-to-center spacing. The NiO ink was cured in an oven at 120° C. for 1 hour.

FIG. 1 is an image of a temperature sensitive ink composition of the present disclosure printed onto silver electrodes on a flexible polyethylene naphthalate substrate showing a uniform printed film. FIG. 1 provides an image of 4 passes of the NiO ink of Example 1 on the silver electrodes on the flexible polyethylene naphthalate substrate. The images indicates that the print NiO ink of Example 1 produced a uniform film.

Figure 2:
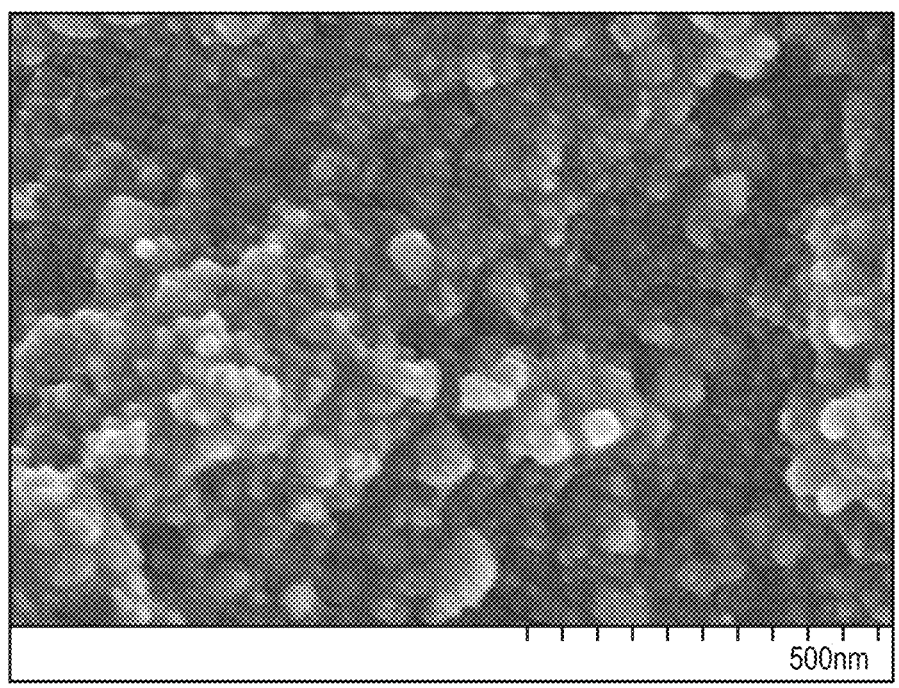
FIG. 2 is an image of a temperature sensitive ink composition of the present disclosure printed onto a flexible polyethylene naphthalate substrate and heated.
Figure 3:
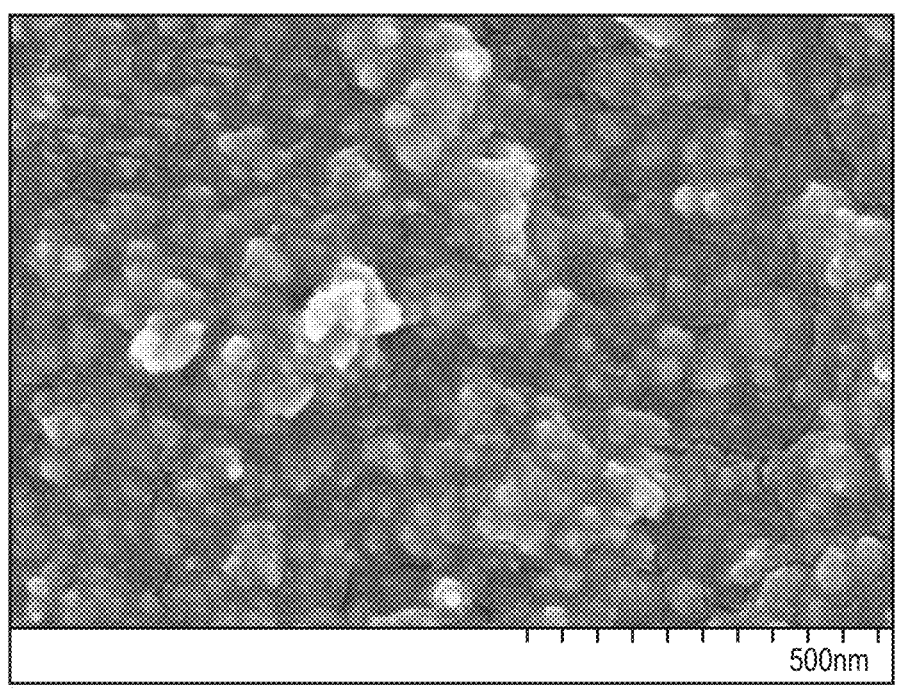
FIG. 3 is an image of a temperature sensitive ink composition of the present disclosure printed onto a flexible polyethylene naphthalate substrate and heated.

FIG. 2 and FIG. 3 show an SEM (scanning electron micrograph) image that indicates the intimate contact of the NiO nanoparticles. FIG. 2 and FIG. 3 provide SEM images (magnification 100k×) of 4 passes of the NiO ink of Example 1 (FIG. 2) and 8 passes of the NiO ink of Example 1 (FIG. 3) both printed onto flexible polyethylene naphthalate substrates and heated to 120° C. for one hour. The images of FIG. 2 and FIG. 3 indicate that the NiO nanoparticles are in intimate contact with one another.

Figure 4:
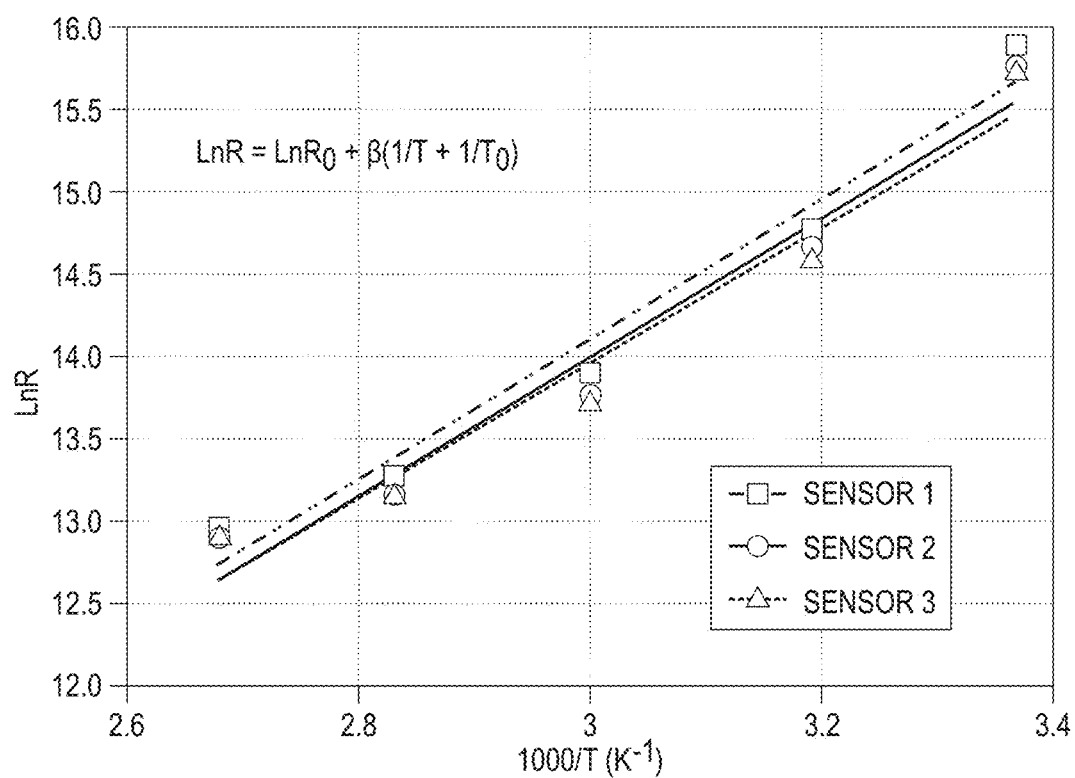
FIG. 4 is a graph showing resistance, Ln R, (y axis) versus inverse temperature ($K^{-1}$, x axis) of a temperature sensitive ink composition of the present disclosure.

Square patches of the ink of Example 1 were aerosol jet printed onto an interdigitated pattern of silver nanoparticle ink printed on flexible polyethylene naphthalate. 10 passes were printed to ensure adequate coverage, then cured at 120° C. for 1 hour. Table 2 provides data obtained from measuring the resistance at various temperatures. FIG. 4 shows resistance, Ln R, (y axis) versus inverse temperature (K$^{-1}$, x axis) of the ink of Example 1. The plotted data generates a straight line where the slope is β. Three different samples, Sensor 1, Sensor 2, and Sensor 3, of the same sensor prepare using the ink of Example 1 behave very similarly. The average β value is 4189 K which is close to the theoretical β value for nickel (=4300 K).

TABLE 2

| | Temperature (° C.) | | | | | |
|---|---|---|---|---|---|---|
| | 23.5 | 40 | 60 | 80 | 100 | Calculated Slope β |
| | 1000/T(K$^{-1}$) | | | | | |
| | 3.4 | 3.2 | 3.0 | 2.8 | 2.7 | (K) |
| Ln R Sensor 1 | 15.9 | 14.8 | 13.9 | 13.3 | 13.0 | 4268 |
| Ln R Sensor 2 | 15.8 | 14.7 | 13.8 | 13.2 | 12.9 | 4202 |
| Ln R Sensor 3 | 15.7 | 14.6 | 13.7 | 13.2 | 12.9 | 4098 |
| Average | | | | | | 4189 |

Square patches of the ink of Example 1 were aerosol jet printed onto flexible polyethylene naphthalate with 2, 4, and 10 passes, then cured at 120° C. for 1 hour. The adhesion of the ink of Example 1 was assessed by scoring the square patches in a cross-hatched pattern with a scalpel blade, then applying Scotch™ tape over the scored patch, and peeling off the tape. The amount of transfer of the printed material onto the tape indicates the adhesiveness of the ink. An established SIR chart quantifies the adhesiveness on 5 levels:

1. No adhesion—all the ink transfers to the tape
2. Low adhesion—most of the ink transfers to the tape
3. Partial adhesion—the ink is evenly split between the substrate and the tape
4. Excellent adhesion—very little ink transfers to the tape
5. Perfect adhesion—none of the ink transfers to the tape.

Adhesion was determined to be a 4 for all of the patches, regardless of the number of passes used to print the patch (very little ink was transferred onto the tape). The adhesion could be further optimized in different ways. In embodiments, the adhesion can be optimized by increasing the loading of the polyvinyl butyral, heating to a higher temperature to induced self-cross linking of the polyvinyl butyral, heating, in embodiments at 120° C., for a longer amount of time, or combinations thereof.

Thus, provided herein is an a digitally printable, in embodiments, ink jet printable or aerosol jet printable, thermistor ink comprising nickel oxide as the active component, and polyvinyl butyral as a binder. A solvent combination is selected which imparts jettability of the ink and provides NiO dispersion stability. It is believed that the present ink compositions are the first jettable thermistor inks. In addition, the ink can be cured at low temperatures, such as about 120° C. and still demonstrate measurable thermistor responses. The ink compositions enable printing onto flexible and/or low Tg substrates and ultimately enables digitally addressable temperature sensing properties for printed electronics. It is not straightforward to formulate metal oxide nanoparticles into a stable, jettable ink wherein the jetted material exhibits excellent adhesion while maintaining its thermistor characteristics. The present ink compositions comprise, in embodiments, a selected solid content, a selected ratio of active material to binder, and a selected solvent system to provide a stable thermistor ink.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A temperature sensitive ink composition comprising:
    a metal oxide nanoparticle;
    a binder;
    a solvent, wherein the solvent is selected from the group consisting of propylene glycol monomethyl ether acetate, 1-phenoxy-2-propanol, di(propylene glycol) monomethyl ether acetate, propylene glycol methyl ether, di(propylene glycol)methyl ether, methyl isobutyl ketone, diisobutyl ketone, methyl ethyl ketone, and combinations thereof;
    an optional dispersant; and
    an optional surfactant;
    wherein the ink composition is a thermistor ink that exhibits a change in resistance which is dependent on temperature.

2. The ink of claim 1, wherein the metal oxide nanoparticle is selected from the group consisting of cobalt oxide, nickel oxide, iron oxide, manganese oxide, titanium oxide, barium titanium oxide, barium titanate, lead oxide, lead titanate, strontium titanate, zinc oxide, copper oxide, tin oxide, and combinations thereof.

3. The ink of claim 1, wherein the metal oxide nanoparticle is a nickel oxide nanoparticle.

4. The ink of claim 1, wherein the binder is selected from the group consisting of polyvinyl butyral, poly vinyl phenol, poly vinyl alcohol, poly(dimethylsiloxane), poly(ethylene vinyl acetate), polyethylene, polypropylene, polystyrene, poly(ethylene glycol), poly(methyl methacrylate), poly(oxymethylene), poly(vinyl phenol-co-methacrylate), poly(isoprene), poly(butadiene), poly(styene-isoprene-styrene), poly(styrene-butadiene-styrene), polyurethane, polyurea, poly(styrene-ethylene-butylene-styrene), polyester, cellulose, and combinations thereof.

5. The ink of claim 1, wherein the binder is polyvinyl butyral.

6. The ink of claim 1, wherein the solvent comprises a combination of propylene glycol methyl ether acetate and 1-phenoxy-2-propanol.

7. The ink of claim 1, wherein the metal oxide nanoparticle is present in the ink composition in an amount of from about 1 to about 65 percent by weight based upon the total weight of the ink composition; and
    wherein the binder is present in the ink composition in an amount of from about 0.1 to about 25 weight percent by weight based upon the total weight of the ink composition.

8. The ink of claim 1, wherein the metal oxide nanoparticle is present in an amount of from about 10 to about 50 percent by weight based upon the total weight of the ink composition; wherein the binder is present in an amount of from about 0.5 to about 25 percent by weight based upon the total weight of the ink composition; and wherein the solvent is present in an amount of from about 40 to about 99 percent by weight based upon the total weight of the ink composition.

9. The ink of claim 1, wherein a printed thermistor film prepared with the ink of claim 1 provides a β value which approaches the theoretical value of β (4300 K).

10. The ink of claim 1, wherein the ink has a viscosity of from about 5 to about 300 centipoise at a temperature of from about 20 to about 30° C.

11. The ink of claim 1, wherein the metal oxide nanoparticle is a nickel oxide nanoparticle;
    and wherein the binder is polyvinyl butyral.

12. The ink of claim 1, wherein the metal oxide nanoparticle is a nickel oxide nanoparticle;
    wherein the binder is polyvinyl butyral; and
    wherein the solvent comprises a combination of propylene glycol methyl ether acetate and 1-phenoxy-2-propanol.

13. The ink of claim 1, wherein the metal oxide nanoparticle is a nickel oxide nanoparticle; and
    wherein the nickel oxide nanoparticle and binder are present in a ratio of nickel oxide nanoparticle to binder of about 10:1.

14. A process for preparing an ink composition comprising:
    combining a metal oxide nanoparticle;
    a binder;
    a solvent, wherein the solvent is selected from the group consisting of propylene glycol monomethyl ether acetate, 1-phenoxy-2-propanol, di(propylene glycol) monomethyl ether acetate, propylene glycol methyl ether, di(propylene glycol)methyl ether, methyl isobutyl ketone, diisobutyl ketone, methyl ethyl ketone, and combinations thereof;
    an optional dispersant; and
    an optional surfactant;
    wherein the ink composition is a thermistor ink that exhibits a change in resistance which is dependent on temperature.

15. The process of claim 14, wherein the metal oxide nanoparticle is selected from the group consisting of cobalt oxide, nickel oxide, iron oxide, manganese oxide, titanium oxide, barium titanium oxide, barium titanate, lead oxide, lead titanate, strontium titanate, zinc oxide, copper oxide, tin oxide, and combinations thereof.

16. The process of claim 14, wherein the binder is selected from the group consisting of polyvinyl butyral, poly vinyl phenol, poly vinyl alcohol, poly(dimethylsiloxane), poly (ethylene vinyl acetate), polyethylene, polypropylene, polystyrene, poly(ethylene glycol), poly(methyl methacrylate), poly(oxymethylene), poly(vinyl phenol-co-methacrylate), poly(isoprene), poly(butadiene), poly(styene-isoprene-styrene), poly(styrene-butadiene-styrene), polyurethane, polyurea, poly(styrene-ethylene-butylene-styrene), polyester, cellulose, and combinations thereof.

17. A process comprising:
   providing a composition comprising a metal oxide nanoparticle; a binder; a solvent, wherein the solvent is selected from the group consisting of propylene glycol monomethyl ether acetate, 1-phenoxy-2-propanol, di(propylene glycol) monomethyl ether acetate, propylene glycol methyl ether, di(propylene glycol)methyl ether, methyl isobutyl ketone, diisobutyl ketone, methyl ethyl ketone, and combinations thereof; an optional dispersant; and an optional surfactant; wherein the ink composition is a thermistor ink that exhibits a change in resistance which is dependent on temperature;
   depositing the ink composition onto a substrate to form deposited features; and
   optionally, heating the deposited features on the substrate to form temperature sensitive features on the substrate.

18. The process of claim 17, wherein depositing the ink composition comprises depositing using ink jet printing or aerosol printing.

19. A temperature sensitive ink composition comprising:
   a metal oxide nanoparticle;
   a binder;
   a solvent, wherein the solvent comprises a combination of propylene glycol methyl ether acetate and 1-phenoxy-2-propanol;
   an optional dispersant; and
   an optional surfactant;
   wherein the ink composition is a thermistor ink that exhibits a change in resistance which is dependent on temperature.

20. A temperature sensitive ink composition comprising:
   a metal oxide nanoparticle, wherein the metal oxide nanoparticle is a nickel oxide nanoparticle;
   a binder, wherein the binder is polyvinyl butyral;
   a solvent, wherein the solvent comprises a combination of propylene glycol methyl ether acetate and 1-phenoxy-2-propanol;
   an optional dispersant; and
   an optional surfactant;
   wherein the ink composition is a thermistor ink that exhibits a change in resistance which is dependent on temperature.

* * * * *